United States Patent [19]

Ottoson

[11] 4,214,190

[45] Jul. 22, 1980

[54] TENSION CONTROLLING

[75] Inventor: Allen E. Ottoson, Westboro, Mass.

[73] Assignee: Vee Arc Corporation, Westboro, Mass.

[21] Appl. No.: 870,630

[22] Filed: Jan. 19, 1978

[51] Int. Cl.$^2$ ............................................. H02P 3/14
[52] U.S. Cl. ................................. 318/356; 318/532; 318/6
[58] Field of Search ............... 318/356, 345 G, 345 C, 318/532, 347, 350, 331, 6; 307/252 F

[56] References Cited

U.S. PATENT DOCUMENTS

| | | | |
|---|---|---|---|
| 3,095,534 | 6/1963 | Cockrell | 318/331 |
| 3,221,237 | 11/1965 | Kalenian | 318/347 |
| 3,470,437 | 9/1969 | Douglass | 318/345 C |
| 3,601,673 | 8/1971 | Mason | 318/345 C |
| 3,619,752 | 11/1971 | Bateika | 318/331 |

*Primary Examiner*—David Smith, Jr.
*Attorney, Agent, or Firm*—Wolf, Greenfield & Sacks

[57] ABSTRACT

Shunt motor field control for setting motor torque (and thereby controlling tension on a reeler or the like driven by the motor) comprising thyristor control gated by a comparator with a ramp-form voltage input compared to a reference level established by an operator setting of a potentiometer. The ramp-form voltage is generated by charging and discharging a capacitor and provides a spike voltage through the comparator when the reference level is exceeded. Means are provided to compensate potentiometer and capacitor tolerances to match potentiometers to the torque control setting range.

1 Claim, 2 Drawing Figures

TENSION CONTROLLING

BACKGROUND OF THE INVENTION

The present invention relates to drive controls for torque motors used particularly to drive reelers, rollers, conveyors, presses and the like, with operator adjustable tension (torque) control.

D.C. shunt wound motors driven off a 115V, 60 cycle single phase A.C. line, have long been used for such purposes and tension (torque) control has been provided by a field circuit comprising a variable autotransformer to change field strength and a rectifier. Variable autotransformers have also been used in armature circuits.

It is an important object of the present invention to eliminate the cost and bulk of the variable autotransformer while providing control conditions consistent with a tolerance of a captive load which varies by a factor of 4—5× and simple circuitry and low cost.

SUMMARY OF THE INVENTION

A shunt wound D.C. motor connectable to a single phase A.C. line comprises an armature circuit with a capacitor or inductor in series with a full wave rectifier and the armature to provide a preset tapered tension speed torque characteristic to the motor, variable only through field strength adjustment. Armature current is kept nearly constant in the manner described in U.S. Pat. No. 3,221,237 to Aram Kalenian.

The field coil is connected to the A.C. line via a thyristor gated by a solid state comparator having a first input which sets a reference voltage level and a second input providing a pulsing ramp form voltage which rises from below to above the reference level to produce a spiked voltage through the comparator to activate the thyristor. The reference level is manually variable through a potentiometer to control tension.

This provides a uniquely effective use of thyristors AB VEE PO1 in a shunt motor field circuit fulfilling the above objects.

The invention may also be utilized in other contexts than shunt motors, essentially for any inductive or resistive load having a soft di/dt characteristic similar to that of torque motor field coils.

Other objects, features and advantages of the invention will be apparent from the following detailed description of preferred embodiments thereof, taken in connection with the accompanying drawing, in which,

DETAILED DESCRIPTION OF PREFERRED EMBODIMENTS

Figure 1:
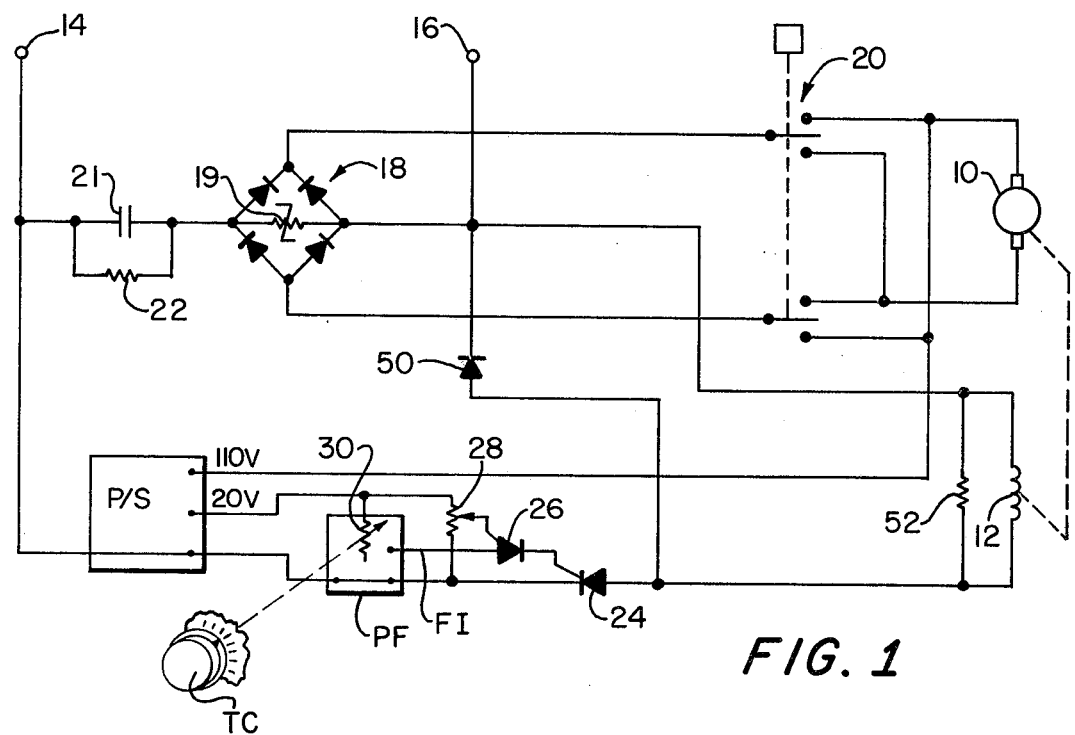
FIGS. 1 and 2 are general and detailed circuit diagrams of a preferred embodiment of the invention.
Figure 2:
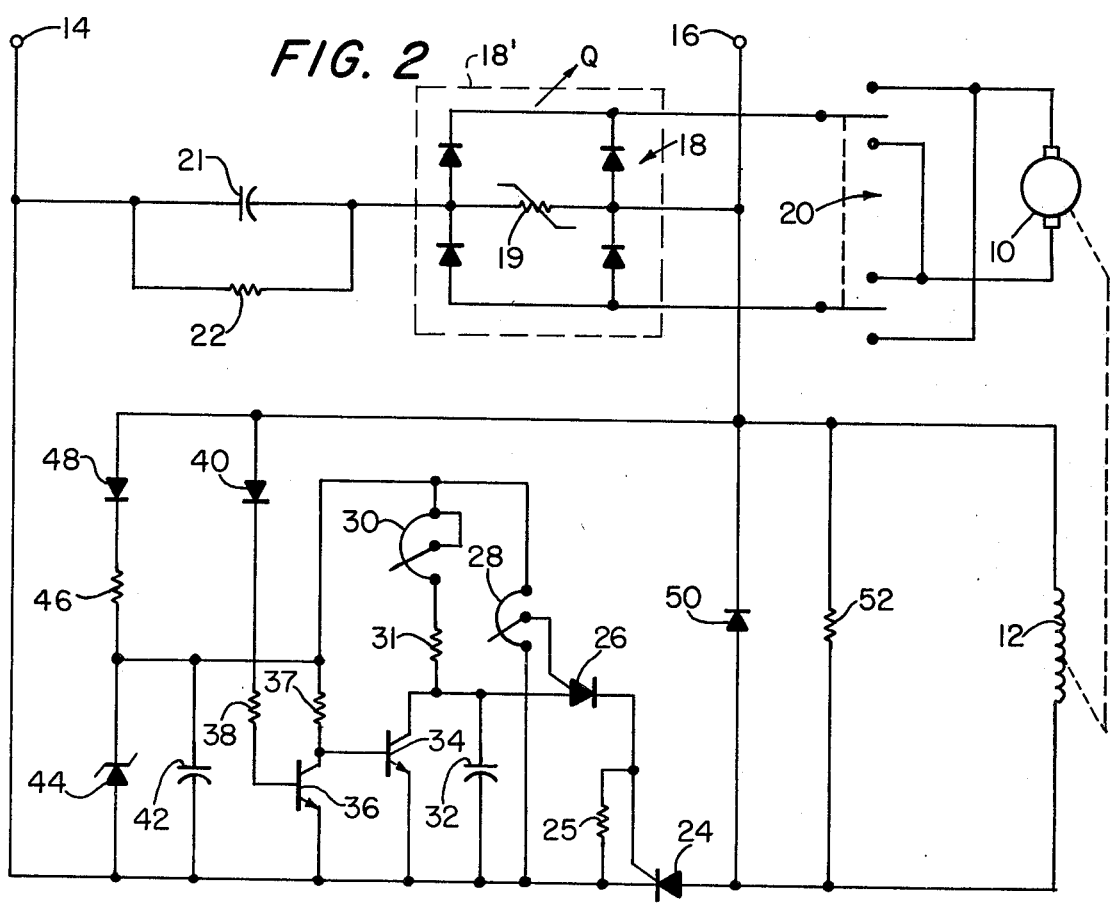

Referring now to FIGS. 1-2, a motor comprises an armature 10 and shunt wound field coil 12 connectable to an A.C. source via terminals 14, 16 for single phase operation. The armature circuit has a diode bridge circuit rectifier 18 (with a voltage suppressor 19 to suppress transients) and a series capacitor 21 with resistive component 22, all as embodied in commercially available CAPACITRON brand drives and drive controls, e.g., model CD. A reversing switch 20 controls on-off and rotation direction selection.

The field coil is powered by a thyristor 24 (with resistor 25) which is gated by voltage passed through a comparator element preferably a programmable unijunction transistor 26. The comparator gate voltage sets a reference level (determined by variable resistor 28) which must be exceeded by anode voltage before the transistor will pass the latter voltage to the gate of thyristor 24. A power factor control circuit PS comprises a tension (torque) control potentiometer 30 with a fixed resistor 31 adjustable via a knob TC and a capacitor 32 to determine the anode voltage level and timing.

A transistor 34, when on, diverts current from capacitor 34. A further rectifying filtering and voltage drop power supply circuit PS comprising capacitor 42, zener diode 44, resistor 46 and diode 48 provides 20 volts D.C. power supply to the tension control circuit. Turn-on of transistor 34 is controlled by transistor 36 which receives a half-wave-rectified and dropped voltage (via diode 40 and resistor 38) from the 110 volt line. A free wheeling diode is provided at 50 and a resistor at 52 as shown as conventional (per se) field coil accessories.

A preferred example of values for the components shown comprises:

| | | | |
|---|---|---|---|
| Thyristor 24 | C107C | Resistors | |
| pot. 28 | 20K, ½W | | |
| pot. 30 | 100K, 1W | 25 | 330 Ω ½W |
| | | 37 | 33K, ½W |
| | Capacitors | 38 | 100K, ½W |
| 21 | 65μF, 165V | 46 | 4.7K, 2W |
| 32 | .1μF, 25V | 52 | 8.2K, 2W |
| 42 | 150 μF, 25V | | |
| | Transistors | Diodes & Active Suppressor (1a) | |
| | | 40 | 1a, 600 piv |
| 34 | GET 2222 | 48 | 1a, 600 piv |
| 36 | GET 2222 | 50 | 1a, 600 piv |
| | | 19 | V150 LA10A |
| | | 44 | 20 V. Zener |

OPERATION

When terminal 16 goes positive on A.C. source half-cycles, transistor 36 is switched on and transistor 34 is switched off, thereby causing charge of capacitor 32 to produce a resultant ramp form voltage rise at the anode of transistor 26. The slope of the ramp is set by the resistive values of 31 and 30, the latter being manually adjustable.

The programmable unijunction transistor 26 requires that its anode voltage exceed its gate voltage by ½ a volt to fire when the voltage at capacitor 32 fulfills this condition, transistor 26 passes the voltage to the gate of thyristor 24 as a spiked pulse and line current passes through field coil 12 and resistor 52.

Potentiometer 28 is factory adjusted to a level to establish a half setting of potentiometer 30 as the mid-range of tension (torque) control for the controlled motor, compensating for tolerances of components 26, 30, 31 and 32.

It is essential to effective operation of the system that externally induced voltage transients be suppressed by elements 19 and 21 or through other equivalent means and that P.U.T. element 26 be protected from heat, e.g., by heat sinking the armature rectifier as indicated at 18' to remove heat-Q which is a substantial circuit heat source and any other circuit heat sources and isolating the rectifier from said P.U.T. element and any other circuit heat sources. It is equally essential that externally induced voltage transients be suppressed and components 19 and 21 accomplish this (although 21 has the primary purposes shown in the above cited Kalenian patent).

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Field control circuit for the field coil of a shunt motor in which armature current is held substantially constant, comprising, line means for connecting the motor field coil to an A.C. source and means for suppressing externally induced voltage transients in the armature and field circuits, thyristor means in the line means for rectification and power control based on phase angle of firing, gating means for the thyristor comprising a solid state comparator with first input means thereto for setting a reference level and second input means thereto providing a ramp form current input rising up to and above said reference level to produce a gating pulse, means for adjusting the ramp slope to control time of input rise to the reference level, means for protecting the comparator from heat produced within the circuit, means for adjusting the reference level to compensate the tolerances of the adjusting and second input means so that the ramp adjusting means from control circuit to control circuit are equally calibrated despite such tolerances to provide uniform control, and wherein said solid state comparator comprises a programmable unijunction transistor (P.U.T.), said second input means comprise a capacitor and charging circuit therefor connected to said P.U.T. anode providing said ramp for a current input to the anode of the transistor by discharge of the capacitor, said reference level means comprising a variable voltage source connected to the gate of the P.U.T.

* * * * *